US 11,500,679 B2

(12) United States Patent
Subbaramaiah et al.

(10) Patent No.: US 11,500,679 B2
(45) Date of Patent: Nov. 15, 2022

(54) OPERATING A CONTROLLER IN A MOTOR VEHICLE ACCORDING TO DIFFERENT TIME SLOTS

(71) Applicant: Robert Bosch GmbH, Stuttgart (DE)

(72) Inventors: Sagar Subbaramaiah, Stuttgart (DE); Eckart Schlottmann, Affalterbach (DE); Hakan Atasayar, Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 671 days.

(21) Appl. No.: 16/478,734

(22) PCT Filed: Jan. 5, 2018

(86) PCT No.: PCT/EP2018/050236
§ 371 (c)(1),
(2) Date: Sep. 25, 2019

(87) PCT Pub. No.: WO2018/134061
PCT Pub. Date: Jul. 26, 2018

(65) Prior Publication Data
US 2020/0257563 A1 Aug. 13, 2020

(30) Foreign Application Priority Data

Jan. 17, 2017 (DE) .......................... 102017200669.2

(51) Int. Cl.
*G06F 9/50* (2006.01)
*G05B 19/042* (2006.01)
(52) U.S. Cl.
CPC ......... *G06F 9/5027* (2013.01); *G05B 19/042* (2013.01); *G05B 2219/2637* (2013.01)
(58) Field of Classification Search
CPC ................ G06F 9/5027; G05B 19/042; G05B 2219/2637
See application file for complete search history.

(56) References Cited

U.S. PATENT DOCUMENTS

2011/0225595 A1* 9/2011 Chujo ................... G06F 9/5038
718/106
2014/0078960 A1* 3/2014 Nakata ................ H04W 56/001
370/328

(Continued)

FOREIGN PATENT DOCUMENTS

DE 102005059450 A1 6/2007
DE 102012222908 A1 6/2014

(Continued)

OTHER PUBLICATIONS

International Search Report dated Mar. 28, 2019 issued in International Application No. PCT/EP2018/050236 dated Jan. 5, 2018.

(Continued)

*Primary Examiner* — Beau D Spratt
(74) *Attorney, Agent, or Firm* — Norton Rose Fulbright US LLP; Gerard Messina

(57) ABSTRACT

A method for operating a controller, including: executing a first task-program in a first time pattern of first time-slots, performing a second task-program in a second time pattern of second time-slots, ascertaining a status variable, indicating whether a result of the first task-program is released, ascertaining the result of the first task-program in an instantaneous first time-slot and transmitted in this slot to a memory area assigned to the second task-program, the second task-program ascertains a second result as a function of the status variable value and the result of the first task-program, the status variable value is transmitted in the instantaneous time-slot to a status memory area assigned to the second task-program, the result of the first task-program and the status variables values are ascertained and transmitted after the beginning of execution of the first task-program and before another execution of the first task-program.

14 Claims, 5 Drawing Sheets

(56) References Cited

U.S. PATENT DOCUMENTS

2015/0356043 A1* 12/2015 Hasse ................. G06F 13/4022
                                                               710/110
2018/0227155 A1*  8/2018 Khoryaev ............. H04W 72/04

FOREIGN PATENT DOCUMENTS

| DE | 102014216381 A1 | 3/2016 |
| JP | 2001005720 A | 1/2001 |
| JP | 2010079622 A | 4/2010 |
| JP | 2010122752 A | 6/2010 |
| JP | 2011118830 A | 6/2011 |
| WO | 2013011713 A1 | 1/2013 |

OTHER PUBLICATIONS

Wikipedia: Dirty bit. Jan. 10,2016 https://en.wikipedia.org/index.php?title=Dirty_bit&oldid=742037783.
Wikipedia: Dirty bit. Nov. 19, 2016 https://en.wikipedia.org/w/index.php?title=Status_register&oldid=738920752.

* cited by examiner

| | DFC1 | DFC2 | DFC3 | DFC4 | ... |
|---|---|---|---|---|---|
| FID1 | 1 | 0 | 1 | 1 | |
| FID2 | 0 | 1 | 0 | 0 | |
| FID3 | 1 | 1 | 1 | 0 | |
| ... | | | | | |

(Related Art)

Fig. 1

OPERATING A CONTROLLER IN A MOTOR VEHICLE ACCORDING TO DIFFERENT TIME SLOTS

FIELD OF THE INVENTION

The present invention relates to a method for operating a controller, in particular, in a motor vehicle, a computer program and a computer for carrying out the method, as well as a machine-readable memory medium on which the computer program is stored. The present invention also relates to a method for the (automated) generation of the computer program.

BACKGROUND INFORMATION

A method is discussed in DE 10 2009 026 995 A1 for operating a bus system, in particular, a CAN bus. Multiple stations are connectable to the bus system. A transmitted message includes an identifier, one particular identifier (for example, IDENT2) invariably being allowed to be used by only one single station. Each of the stations compares the identifier of a transmitted message with the identifiers (for example, IDENT2) used by that station itself. In the event of a match, an error message is generated.

A method for operating a controller is discussed in DE 2014 216 381 A1, the controller including at least one execution unit configured to execute task programs, a first task program and a second task program being executed at least temporarily, the first task program sending a notification to a first execution unit, which the second task program executes, the notification signaling to the second task program and/or to the execution unit executing the second task program that the first task program is ready to receive data from the second task program.

SUMMARY OF THE INVENTION

The method including the features described herein has the advantage that task programs may be particularly reliably executed, even when the calculation is distributed across multiple execution units (for example, processors).

Advantageous refinements are the subject matter of the further descriptions herein.

In one first aspect, the present invention relates to a method for operating a controller, in particular, for a motor vehicle, the controller including at least one, which may be at least two execution units, the execution units being configured, in particular, for executing task programs. In the process, a first task program is carried out in a first time pattern made up of first time slots (the first time slots therefore follow advantageously directly sequentially and are of the same length in each operating cycle). Furthermore, a second task program is carried out in a second time pattern made up of second time slots (the second time slots therefore follow advantageously directly sequentially).

In the process, a status variable is ascertained, which indicates whether a result of the first task program is released. The second task program ascertains a second result as a function of the value of the status variable and of the result of the first task program.

This may take place, for example, as part of an error memory manager, with which the execution of additional diagnoses may be controlled. While there are diagnoses that may be executed very rapidly and with no preconditions (such as, for example, electrical diagnoses of sensors), there are other diagnoses that check the plausibility of recorded values. However, a plausibility error is to be advantageously reported to the error memory manager only if no electrical error has been previously identified.

In order to manage these interdependencies, it is possible to use a so-called FID blocking matrix, in which the release of a task program (in the example, the plausibility check) may be made dependent on the value of the status variables (in the example, the electrical diagnosis taking place).

It is possible that the blocking relationships are ascertained directly when reporting a new result of the first task program (i.e., in the example of the diagnostic result). The transit time of physical signals that convey the value of the status variables is disregarded, however.

If the calculation is distributed to at least two execution units, the problem may arise that the physical values are distributed beyond limits of the execution units and beyond time calculation steps. As the number of execution units increases (in so-called many-core systems) so too does this distribution, because only in this way are the resources of the execution units able to be optimally utilized.

The results of the first task program may now be communicated to the second task program with so-called timed communication (also known as logical execution time). This means, it may be provided that the result of the first task program is ascertained in an instantaneous first time slot. Subsequently, it is transmitted in this instantaneous first time slot to a memory area assigned to the second task program.

In order to obtain a reliable transmission of the value of the status variables, it is possible to block the execution of the first task program until the value of the status variables has been transmitted. However, this may mean that the real time capability of the first task program and, therefore, the execution in the fixed time pattern is disrupted.

It is therefore provided that the value of the status variable is also transmitted in the instantaneous first time slot to a status memory area assigned to the second task program, the result of the first task program as well as the value of the status variables being ascertained and transmitted after the start of execution of the first task program and before another execution of the first task program.

In order not to require a multiple management of results, it may be provided in one refinement that the result of the first task program is transmitted only once per longer time slot made up of first time slot and of second time slot and/or that also the value of the status variables is transmitted only once per longer time slot made up of first time slot and of second time slot.

Establishing the transmission point in time becomes particularly simple if the duration of the longer time slot and of the shorter time slot are integer multiples of one another.

If the result of the first task program and the status variable are stored at arbitrary locations of a memory area before being transmitted to the status memory assigned to the second task program, it is possible that they are not able to be transmitted by the execution unit in one single copying process. This may occur depending on the hardware used, for example, if they are not stored in the same memory bank. It may therefore be advantageously provided that the result of the first task program and the status variable from the first task program are saved in such a way that they may be transmitted simultaneously. This may be accomplished, for example, by storing them in the same memory bank.

In another aspect, it may be provided that a dependency, as is the case between the first and the second task program, analogously also exists between the second and the third task program. This means, it may be provided that a second status variable is ascertained, which indicates whether a result of the second task program is released, the result of the second task program being ascertained in an instantaneous second time slot and being transmitted in this instantaneous second time slot to a memory area assigned to the third task program, the third task program ascertaining a third result as a function of the value of the status variable and of the result of the second task program, the value of the second status variable also being transmitted in the instantaneous second time slot to a status memory area assigned to the third status program, the result of the second task program as well as the value of the second status variables being ascertained and transmitted after the completion of the execution of the second task program and before the second task program is executed again.

In a chain of dependencies of this type, it may be provided, in particular, that the third task program is executed in a third time pattern made up of consecutive third time slots, the value of the status variables also being transmitted only once per longer time slot made up of first time slot and second time slot and the value of the status variables being transmitted only once per longest time slot made up of first time slot and second time slot and third time slot.

If the dependencies are managed in the form of the aforementioned FID blocking matrix, the generation of a computer program that executes such a method is very complex, since the mentioned blockings must take place consistent with the timing of the transmission of the results and of the transmission of the values of the status variables.

In another aspect, a method is therefore provided, with which the automatic generation of this computer program is possible.

In this case, it is provided that the structure of the blocking matrix is not flat, but hierarchically configured. It is provided that task programs whose status variable is transmitted, are assigned a structure object that combines the results of the task programs and those of the task programs which enter the respective task program. The dependencies between the task programs are therefore combined in these structure objects.

It may therefore be provided that a structure object contains the piece of information that the result of the second task program is ascertained as a function of the value of the status variable and as a function of the result of the first task program. This structure object is assigned to the first task program.

It is then further provided that an additional structure object contains the piece of information that the result of the third task program is ascertained as a function of the value of the second status variable and of the result of the second task program. This additional structure object is assigned to the second task program. The computer program is then ascertained as a function of the structure object and of the additional structure object.

This has the advantage that the timing pattern in which the results of the task programs and of the status variables are transmitted may be particularly easily ascertained in an automated manner.

In other aspects, the present invention relates to a machine-readable memory medium, on which the aforementioned computer program is stored. In addition, there is a computer, which is configured (i.e., programmed accordingly) to carry out the method for generating this computer program, and an additional computer (in particular, a controller), which is configured to carry out the aforementioned method.

Specific embodiments of the present invention are explained in greater detail below with reference to the accompanying drawings.

BRIEF DESCRIPTION OF THE DRAWINGS

FIG. 1 shows a FID blocking matrix according to the related art.

DETAILED DESCRIPTION

FIG. 1 shows a FID blocking matrix according to the related art. Based on such a blocking matrix, the task programs that run on an execution unit of a motor vehicle are assigned which diagnostic task programs are required to be carried out so that the corresponding task program itself is able to reliably ascertain a result. The rows are assigned function identifiers FID1, FID2, FID3, . . . , the columns are assigned diagnostic task programs (English: diagnostic fault check) DFC1, DFCT2, DFC3, DFC4, . . . . In this case, each function identifier uniquely corresponds to one task program. One binary value is entered in each of the fields of the matrix thus spanned. "1" means that the corresponding diagnostic task program should be successfully completed before the task program is carried out, "0" means that this is not necessary. As described at the outset, the construction of such a matrix is a complex process.

Figure 2:
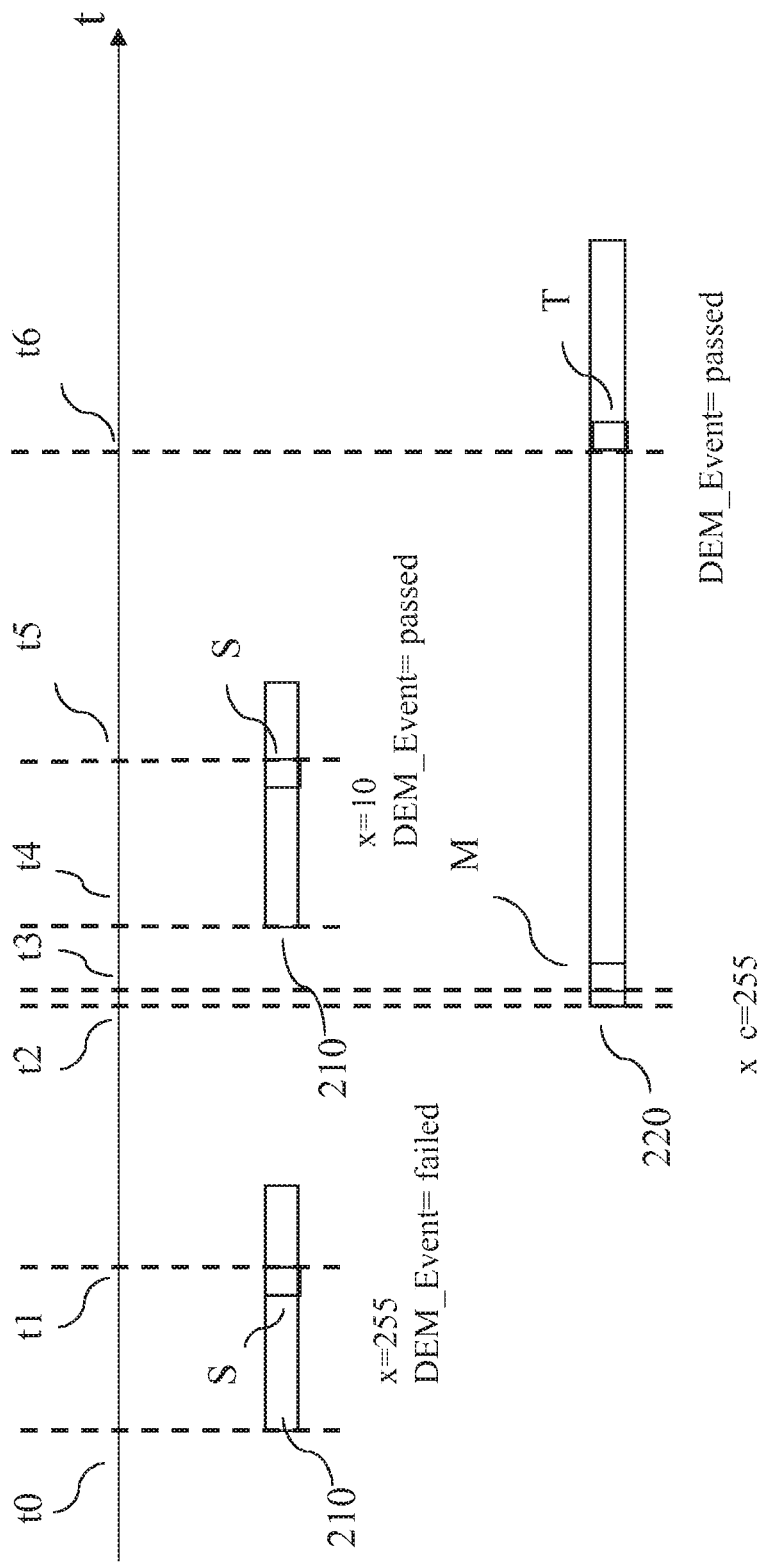
FIG. 2 schematically shows a flow chart according to the related art.

FIG. 2 schematically shows a flow chart according to the related art. The execution of a first task program 210 begins at point in time t0. First task program 210 ascertains a result x, which in this example assumes the value 255. In a step S, first task program 210 checks whether result x has been reliably ascertained. This is not the case here, which is why a global status variable DEM_Event is set to value "failed" at point in time t1, which may be binary-coded, for example, with a "0".

The execution of a second task program 220 begins at point in time t2. At point in time t3, an instruction M copies the value of result x into a memory area assigned to the second task program. This is accomplished in terms of program logic by applying a new variable x_c, to which in the example copied value 255 is then assigned.

The execution of first task program 210 begins again at point in time t4, since it is cyclically repeatedly started. This time, it ascertains result x=10. In step S, first task program 210 again checks whether result x has been reliably ascertained. This is the case here, which is why status variable DEM_Event is set to value "passed" at point in time t5. Finally, at point in time t6, second task program 220 accesses variable x_c in a step T, in order to calculate a result as a function of x_c. In order to check whether the value of variable x_c is reliable, second task program 220 checks the value of status variable DEM_Event. This now has the value "passed", so that second task program falsely assumes that the value of variable x_c is reliable. This may result in errors in the program sequence. One option, therefore, is for second task program 220 to suppress a write access to global value DEM_Event, i.e., block the variable until the access to x_c is completed. However, this potentially results in delays in the sequence of first task program 210.

Figure 3:
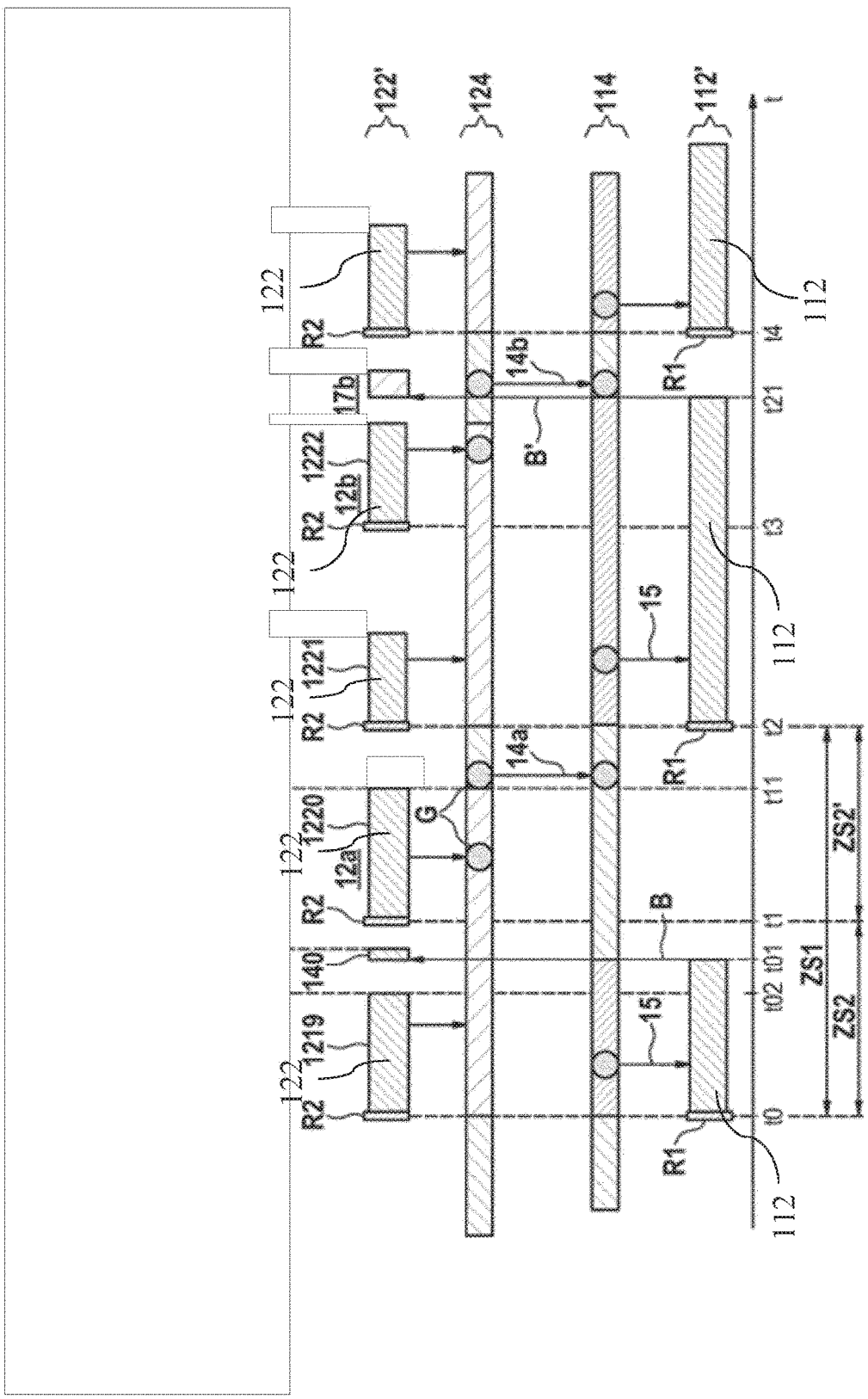
FIG. 3 schematically shows a flow chart according to one specific embodiment of the present invention.

FIG. 3 therefore schematically shows a flow chart according to a first specific embodiment of the present invention. In this example, a second task program 112 is executed as a function of results of a first task program 122.

A starting point in time t0 is indicated on the time scale t, at which both task programs 112, 122 start a new operating cycle. For the following description, it is assumed that second task program 112 is assigned time slots ZS1 of 10 ms (milliseconds), compare also the lower area of FIG. 3 marked with curly brackets 122'. Accordingly, the first operating cycle of second task program 112 extends as of point in time t0 to point in time t2, the second operating cycle of second task program 112 extends between point in time t2, t4, etc. The interval limits or cycle limits between consecutive time slots are indicated by rectangles R1.

As is apparent from FIG. 3, area 112', however, second task program 112 does not always need the full cycle time or length of the assigned time slot of 10 ms in the present case. Instead, all tasks of second task program 112 were processed in the first operating cycle already at point in time t01, and all tasks of second task program 112 were processed in the second operating cycle already at point in time t21. In other words, a time interval t2–t01 exists in the first operating cycle between the end of the processing of first task program 112 and interval limit R1, in which no activity of task program 112 is present, and thus, the computing resources of the execution unit reserved for the entire cycle time of 10 ms remain unused.

Similar to second task program 112, time slots ZS2, ZS2' of constant lengths, in the present case, 5 ms, are also assigned to first task program 122, compare also the vertically upper area of FIG. 3 marked with curly brackets 122'. Accordingly, the first operating cycle of first task program 122 extends as of point in time t0 to point in time t1, the second operating cycle of first task program 122 extends between points in time t1, t2, etc. The interval limits or cycle limits between consecutive time slots of first task program 122 are indicated by rectangles R2.

As is apparent from FIG. 3, area 122', however, first task program 122 does not always need the full cycle time or length of the assigned time slot of, in the present case, 5 ms. Instead, all tasks of first task program 122 were processed in the first operating cycle already at point in time t02, and all tasks of first task program 122 were processed in the second operating cycle already at point in time t11.

Also indicated in FIG. 3, in addition to areas 112', 122', which reflect the activity of individual task programs 112, 122, are a utilization scheme 114 of a second memory area assigned to second task program 112 and a utilization scheme 124 of a first memory area assigned to first task program 122.

First memory area 124 of transmitter task 122 (first task program) includes variables calculated according to one specific embodiment by transmitter task 122, for example, on the basis of input variables, which are to be transmitted to receiver task 112 (second task program). Transmission 14a, 14b of the data by transmitter task 122 to receiver task 112 takes place according to one specific embodiment when transmitter task 122 has completed the calculation of data G to be output, and simultaneously receiver task 112 is finished processing data 15 received in the previous cycle.

According to one specific embodiment, data G may also include a status variable DEM_Event (cf. FIG. 2). If data G are then transmitted into memory area assigned to second task program 112, then status variable DEM_Event is copied into a memory area within this assigned memory area.

According to one specific embodiment, receiver task 112 transmits a notification B to the execution unit of transmitter task 122 as soon as the calculations have been completed within one execution, i.e., no later than at the end of the cycle of the receiver task, cf. point in time t01 in FIG. 3.

In one specific embodiment, it may be provided that another task program 140, also referred to below as "notification task", is executed, in the present case, for example, by the execution unit also executing first task program 122, in order to transmit data from a memory area 124 assigned to first task program 122 (transmitter task) into a memory area 114 assigned to second task program 112 (receiver task). This additional task program 140 may be activated, in particular, by notification B.

In the case of operating systems now commonplace in the automotive sector, notification task 140 may, for example, be entered with the same priority into a list of the activated tasks of the execution ("ready queue") and executed as soon as no other task having a higher priority is required to be executed and tasks previously entered in the same list have been completed. As previously described above, transmitter task and receiver task may be executed on the same or on different processor cores.

In one specific embodiment, data G are transmitted to second task program 112 (receiver task) within the execution of notification task 140 or are at the end of transmitter task 122, depending on which event occurs later.

If notification B takes place before the completion of transmitter task 122, the data transmission 14a may then take place in one specific embodiment at the end of transmitter task 122, i.e., after point in time t11. In this case, transmitter task 122 itself may initiate or execute data transmission 14a. If notification B' takes place after sender task 122 has been completed, notification task 140 in one specific embodiment may initiate or execute transmission 14b of the data to receiver task 112.

When exactly notification task 140 is executed in relation to transmitter task 122 is a function in one specific embodiment of the priorities of the two tasks. If both tasks 122, 140 have the same priority, it is precluded that tasks 122, 140 are able to mutually interrupt one another, and notification task 140 may be executed either before or after transmitter task 122, depending on when notification B, B' takes place in relation to the execution of transmitter task 122.

In another advantageous specific embodiment, it is provided that second task program 112 and first task program 122 have different cycle times ZS1, ZS2, a cycle time ZS1 of second task program 112 being longer than cycle time ZS2 of first task program 122, and data being transmitted from a memory area 124 assigned to first task program 122 into a memory area 114 assigned to second task program 112 within the cycle ZS2' of second task program 122 that is chronologically in the range of a cycle end of second task program 112.

In one advantageous specific embodiment, an algorithm is provided, which ensures that data G are transmitted by transmitter 122 to receiver 112 exactly once per slower cycle ZS1 or per time interval. With a counter mechanism within transmitter or receiver task 122, 112, it is ensured that only the respectively last execution 1220 of "faster" task 122 initiates (for example, by notification B, if receiver task 112 has the higher activation rate) or executes (if transmitter task 112 is activated more frequently) a data transmission 14a within time interval ZS1 of slower task 112. For this purpose, a counter is incremented each time at the end of the faster task. If the counter content corresponds to the ratio of lower scan time to faster scan time, the data transmission is allowed and the counter is reset to zero.

In the example in FIG. 3, transmitter task 122 has the higher activation rate of 5 ms as compared to 10 ms in the case of receiver task 112. Thus, according to one specific embodiment, a data transmission 14a, 14b is carried out only with every second execution 1220, 1222, but not in executions 1219, 1221. This advantageously ensures a deterministic behavior within the meaning of "logical execution time".

Figure 4:
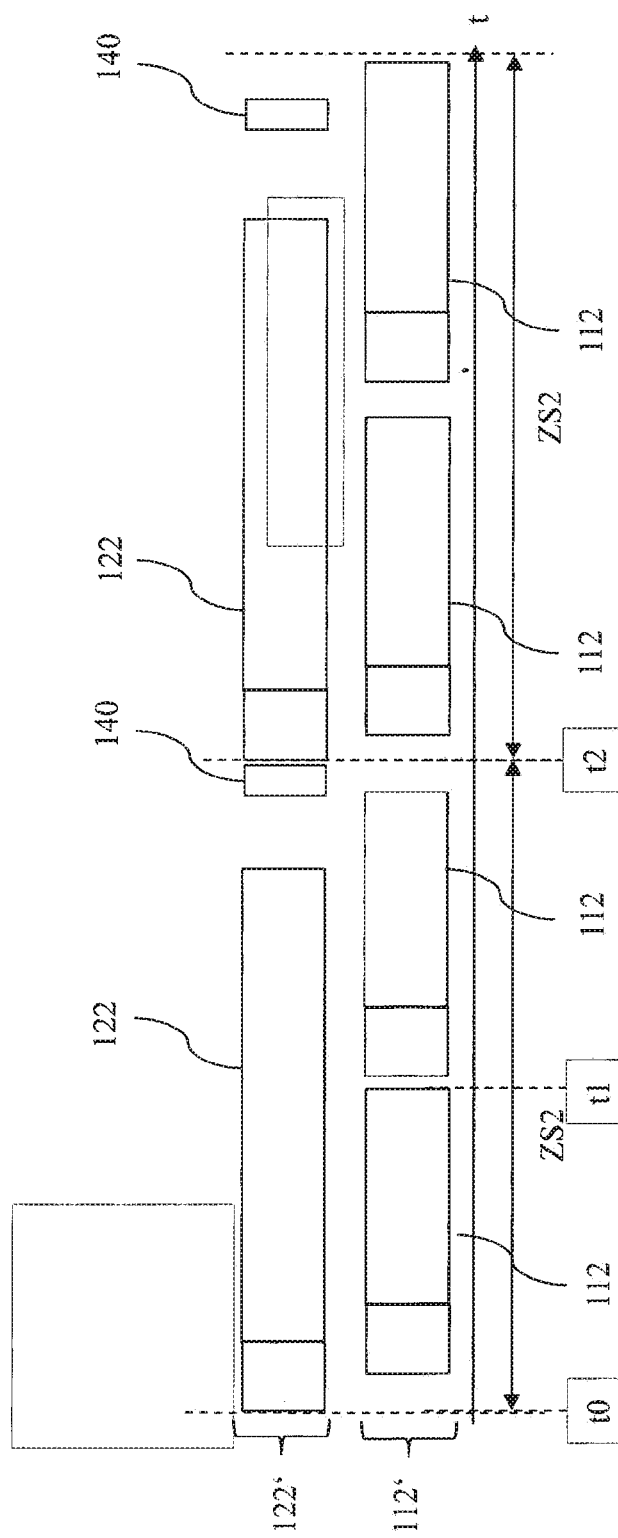
FIG. 4 schematically shows a flow chart according to a second specific embodiment of the present invention.

FIG. 4 schematically shows a flow chart according to a second specific embodiment of the present invention. In this example as well, second task program 112 is executed as a function of results of a first task program 122.

A start point in time t0 is indicated on time scale t, at which both task programs 112, 122 start a new operating cycle. First task program 122 is assigned a cycle time, i.e., a length of a time slot ZS2, which is twice as long as the cycle time assigned to second task program 112. This means that in contrast to the exemplary embodiment illustrated in FIG. 3, the cycle time of first task program 122 is longer than the cycle time of second task program 112.

Second task program 122 carries out a diagnosis, ascertains in time step t a result v, (which is referred to as vt) and further ascertains a status variable Event. Time step t in this case refers to the operating cycle of second task program 122. In the example (see area 122'), second task program 122 carries out a calculation vt in the first operating cycle between the points in time t0 and t2, which fails. Using a command Dem_SetEventStatus, second task program 122 sets the value of variables vt in the memory area assigned to it to hexadecimal value "FF", and the value of status variables Event to value False. Using a call up of a function FIM_GetFuncPermission, the task program requests whether a diagnostic function is to be carried out. This permission is a function of status variables Event. Function FIM_GetFuncPermission therefore accesses the value of status variables Event for time step t. Furthermore, the value of variables v at point in time t may be retrieved using function FIM_GetFuncPermission. As described in FIG. 3, notification task 140 copies the value of variables vt and Event before point in time t2 into a memory area assigned to first task program 112. In one specific embodiment, variables vt and Event are stored in the memory area assigned to second task program 122 in such a way that they are able to be copied together using one single copy command.

Using function FIM_GetFuncPermission, first task program 112 queries in a first operating cycle between t0 and t1 the value of variables v and Event, which are situated in the memory area assigned to first task program 112. These variables have the values that have been ascertained by second task program 112 in preceding operating cycle t−1. Thus, they have the values vt−1 and True.

In the following operating cycle, in time step t+1 of second task program 122, in time slot ZS2' beginning with point in time t2, second task program 122 ascertains result vt+1 to hexadecimal value "15". Since this calculation does not fail, status variable Event is assigned value True. This assignment of the variable values takes place again using command Dem_SetEventStatus. At a later point in time, notification task 140 copies these values from the memory area assigned second task program 122 into the memory area assigned first task program 112.

In the third and fourth operating cycle of first task program 112, function FIM_GetFuncPermission is able to access the values of variables v and of status variables Event, which are present in the memory area assigned to first task program 112. These have the values vt=$FF and Event=False.

Thus, a consistent data access of first task program 112 is ensured as compared to the method depicted in FIG. 2.

Figure 5:
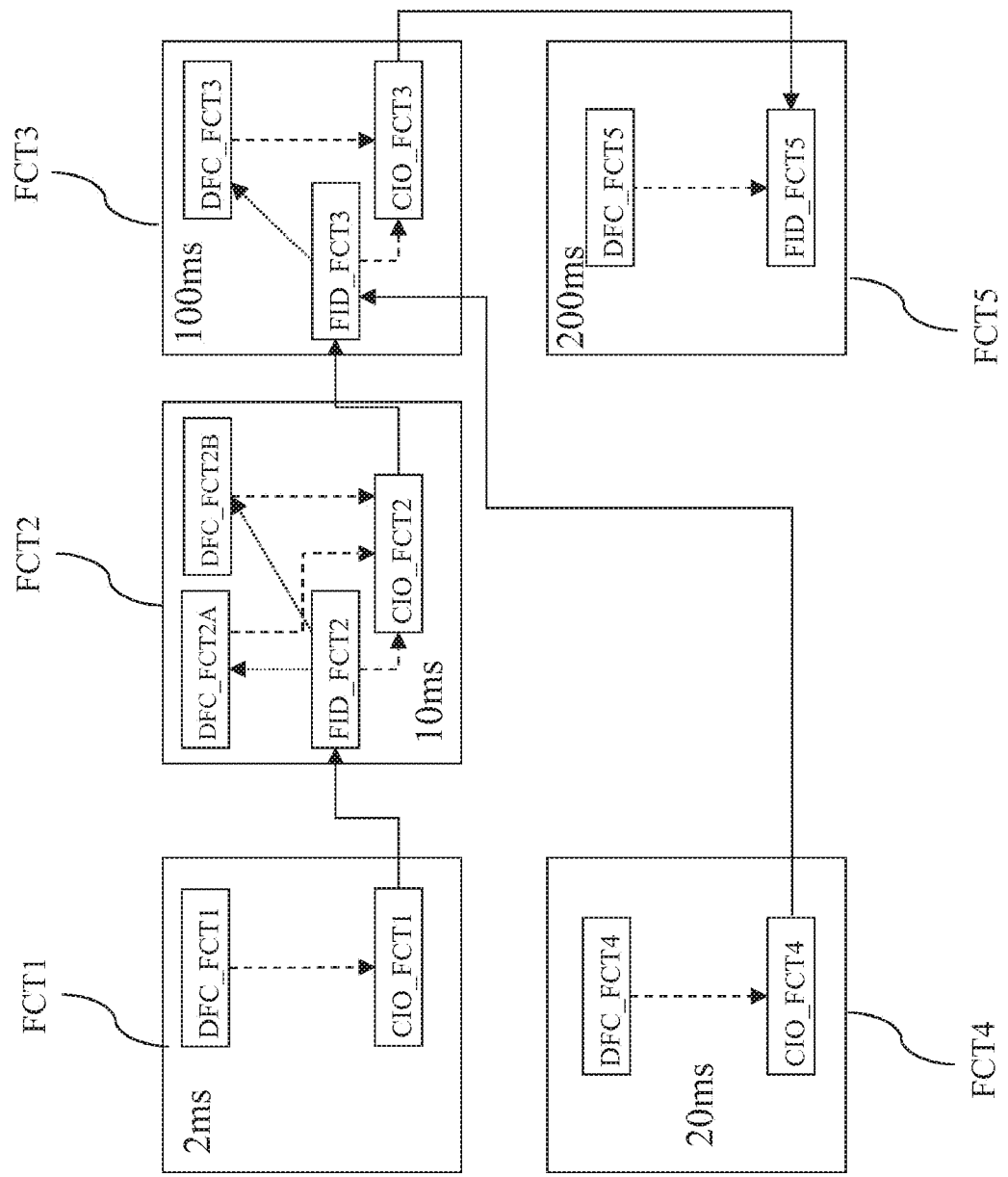
FIG. 5 schematically shows a flow chart according to a third specific embodiment of the present invention.

FIG. 5 schematically shows a flow chart of a third specific embodiment of the present invention. Task programs FCT1, . . . , FCT5 are depicted. The execution of each of these task programs FCT1, . . . , FCT5 may be a function of results of one or of multiple diagnostic functions DFC_FCT1, . . . DFC_FCT5, which checks or check the correct functioning of components of the motor vehicle. The transmission of the results and status variables is indicated by dashed arrows.

Task program FCT1 is carried out in a time pattern having time slots, the duration of which is 2 ms, and carries out a diagnostic function DFC_FCT1. The result and status variable of DFC_FCT1 are transmitted to task program FCT2 (indicated by an arrow to the Function Identifier FID_FCT2). The execution of task program FCT2 is a function of the result and status variable of DFC_FCT1. Task program FCT2 is carried out in a time pattern having time slots, the duration of which is 10 ms, and carries out a diagnostic function DFC_FCT2A, DFC_FCT2B. The results and status variables are fed to task program FCT3. Task program FCT4 is carried out in a time pattern having time slots, the duration of which is 20 ms, and carries out a diagnostic function DFC_FCT4. The result and status variable are also fed to task program FCT3. The execution of task program FCT3 is a function of the result and status variable of diagnostic functions DFC_FCT2A, DFC_FCT2B and DFC_FCT4. Task program FCT3 is carried out in a time pattern having time slots, the duration of which is 100 ms, and carries out a diagnostic function DFC_FCT3. The result and status variable are fed to task program FCT5. The execution of task program FCT5 is a function of the result and status variable of DFC_FCT5. Task program FCT5 is carried out in a time pattern having time slots, the duration of which is 200 ms, and carries out a diagnostic function DFC_FCT5.

To generate a computer program that executes these task programs, it is necessary to ascertain the correct timing of the task programs and to correctly construct the blocking matrix (cf. FIG. 1). For this purpose, a structure object CIO_FCT_1, . . . CIO_FCT_5 is defined at the output of task programs FCT1, . . . , FCT5, which combines the diagnostic functions of the task program and those of the task programs that are entered in this task program.

This results on the one hand in the possibility of determining automatically the preceding diagnoses in a task function located further back in the tree illustrated in FIG. 5. Moreover, it is possible to calculate the timing information for the data flow using the piece of information in which time pattern which diagnostic function is carried out and where which blocking reason is queried, so that the calculation of the blocking relationships may be carried out at the same speed as the physical exchange of data.

This is to be elaborated upon in the example of the correct calculation of the timing for task program FCT_5, assigned to the 200 ms pattern: DFC_FCT_5 is reported from the same computation pattern and is directly and immediately incorporated. DFC_FCT_3 is incorporated into CIO_FCT_3, which has a time assignment to the 100 ms pattern. Consequently, the status of the DFC_FCT_3 must be transmitted with the timed communication transition from the 100 ms pattern to the 200 ms pattern. DFC_FCT_4 is incorporated into CIO_FCT_4 which, in turn is incorporated into FID_FCT_3 and then in CIO_FCT_3. It has a time assignment to the 20 ms pattern. Consequently, the status of DFC_FCT_4 must be transmitted with the timed communication transition from the 20 ms pattern to the 100 ms pattern and subsequently from the 100 ms pattern to the 200 ms pattern. Thus, similar for all DFCs, DFC_FCT_1 is communicated via the following chain: 2 ms→10 ms→100 ms→200 ms.

What is claimed is:

1. A method for operating a controller, for a motor vehicle, the controller including at least one execution unit configured for executing a task program, the method comprising:
   executing a first task program in a first time pattern made up of first time slots;
   performing a second task program in a second time pattern made up of second time slots, wherein a duration of each second time slot is less than a duration of each first time slot;
   ascertaining a status variable, which indicates whether a result of the first task program is released;
   wherein the result of the first task program is ascertained in an instantaneous first time slot and transmitted in the instantaneous first time slot to a memory area assigned to the second task program,
   wherein the second task program ascertains a second result as a function of the value of the status variable and of the result of the first task program,
   wherein the value of the status variable is also transmitted in the instantaneous time slot to a status memory area assigned to the second task program, and
   wherein the result of the first task program and the value of the status variable are ascertained and transmitted after the start of execution of the first task program and before another execution of the first task program.

2. The method of claim 1, wherein the result of the first task program is transmitted only once per longer time slot made up of the first time slot and the second time slot.

3. The method of claim 2, wherein the duration of the longer time slot and of the shorter time slot are integral multiples of one another.

4. The method of claim 1, wherein the value of the status variable is transmitted only once per longer time slot made up of the first time slot and the second time slot.

5. The method of claim 1, wherein the result of the first task program and the status variable are stored in a memory area before the transmission so that they are transmittable simultaneously.

6. The method of claim 1, wherein the first task program and/or the second task program diagnose the operability of components of the motor vehicle.

7. The method of claim 1, wherein a second status variable is ascertained, which indicates whether a result of the second task program is released, the result of the second task program being ascertained in an instantaneous second time slot and being transmitted in this instantaneous second time slot to a memory area assigned to a third task program, the third task program ascertaining a third result as a function of the value of the status variable and of the result of the second task program, the value of the second status variable also being transmitted in the instantaneous second time slot to a status memory area assigned to the third task program, the result of the second task program, as well as the value of the second status variable being ascertained and transmitted after the execution of the second task program is completed and before another execution of the second task program takes place.

8. The method of claim 7, wherein the third task program is executed in a third time pattern made up of consecutive third time slots, the value of the status variable also being transmitted only once per longer time slot made up of first time slot and of second time slot.

9. The method of claim 8, wherein the value of the status variable is also transmitted only once per longest time slot made up of first time slot and of second time slot and of third time slot.

10. The method of claim 1, wherein the at least one execution unit includes at least two execution units.

11. A method for generating a computer program, for operating a controller, for a motor vehicle, the controller including at least one execution unit configured for executing a task program, the method comprising:
   executing a first task program in a first time pattern made up of first time slots;
   performing a second task program in a second time pattern made up of second time slots, wherein a duration of each second time slot is less than a duration of each first time slot;
   ascertaining a status variable, which indicates whether a result of the first task program is released;
   wherein the result of the first task program is ascertained in an instantaneous first time slot and transmitted in the instantaneous first time slot to a memory area assigned to the second task program,
   wherein the second task program ascertains a second result as a function of the value of the status variable and of the result of the first task program,
   wherein the value of the status variable is also transmitted in the instantaneous time slot to a status memory area assigned to the second task program,
   wherein the result of the first task program and the value of the status variable are ascertained and transmitted after the start of execution of the first task program and before another execution of the first task program, and
   wherein a structure object assigned to the first task program contains the piece of information that the result of the second task program is ascertained as a function of the value of the status variable and as a function of the result of the first task program, and an additional structure object assigned to the second task program contains the piece of information that the result of the third task program is ascertained as a function of the value of the second status variable and of the result of the second task program, and the computer program being ascertained as a function of the structure object and of the additional structure object.

12. A non-transitory computer readable medium having a computer program, which is executable by a processor, comprising:
   a program code arrangement having program code for operating a controller, for a motor vehicle, the controller including at least one execution unit configured for executing a task program, by performing the following:
      executing a first task program in a first time pattern made up of first time slots;
      performing a second task program in a second time pattern made up of second time slots, wherein a duration of each second time slot is less than a duration of each first time slot;
      ascertaining a status variable, which indicates whether a result of the first task program is released;
      wherein the result of the first task program is ascer-
      tained in an instantaneous first time slot and transmitted in the instantaneous first time slot to a memory area assigned to the second task program, wherein the second task program ascertains a second result as a function of the value of the status variable and of the result of the first task program, wherein the value of the status variable is also transmitted in the instantaneous time slot to a status memory area assigned to the second task program, and wherein the result of the first task program and the value of the status variable are ascertained and transmitted after the start of execution of the first task program and before another execution of the first task program.

13. The computer readable medium of claim 12, wherein the result of the first task program is transmitted only once per longer time slot made up of the first time slot and the second time slot.

14. A computer, comprising:

a non-transitory computer readable medium having a computer program, which is executable by a processor, including a program code arrangement having program code for operating a controller, for a motor vehicle, the controller including at least one execution unit configured for executing a task program, by performing the following:

executing a first task program in a first time pattern made up of first time slots;

performing a second task program in a second time pattern made up of second time slots, wherein a duration of each second time slot is less than a duration of each first time slot;

ascertaining a status variable, which indicates whether a result of the first task program is released;

wherein the result of the first task program is ascertained in an instantaneous first time slot and transmitted in the instantaneous first time slot to a memory area assigned to the second task program, wherein the second task program ascertains a second result as a function of the value of the status variable and of the result of the first task program, wherein the value of the status variable is also transmitted in the instantaneous time slot to a status memory area assigned to the second task program, and wherein the result of the first task program and the value of the status variable are ascertained and transmitted after the start of execution of the first task program and before another execution of the first task program.

\* \* \* \* \*